Feb. 17, 1931.  H. H. HAIGHT  1,792,584
POWER TAKE-OFF
Filed June 22, 1928

INVENTOR.
Hiram H. Haight
BY
Erwin, Wheeler & Woolard
ATTORNEYS

Patented Feb. 17, 1931

1,792,584

UNITED STATES PATENT OFFICE

HIRAM H. HAIGHT, OF MILWAUKEE, WISCONSIN

POWER TAKE-OFF

Application filed June 22, 1928. Serial No. 287,551.

This invention relates to improvements in power take offs for utilizing the power output of a motor vehicle engine for actuating such extraneous mechanism as fire pumps and the like.

The object of the invention is to provide a novel and simple means for selectively coupling either of two shafts to the driven shaft of a change-speed gear set whereby selectively to transmit the power of a vehicle engine in direct drive either to the rear axle assembly of such engine or to a pump or the like arranged to receive such power.

In the drawings—

Like parts are identified by similar reference characters throughout the several views.

Figure 1:
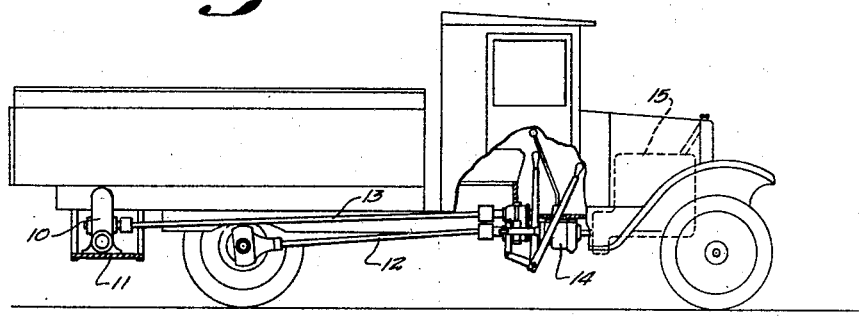
Figure 1 is a side elevation of the mechanism applied to a truck, portions of the truck body and frame being broken away to expose the mechanism to which the invention relates.

The truck shown in Figure 1 is of standard design with the exception that it is equipped with a large-sized pump at 10 suitable for use in fire extinguishment, a platform 11 for carrying such pump, and a power take off in accordance with this invention arranged for selectively coupling either the truck drive shaft 12 or the pump drive shaft 13 directly to the power output shaft of the selective change speed gear set 14 to be driven therethrough from the truck engine 15.

The installation of the power take off may be accomplished in any desired way but is particularly simplified in the present case by mounting the entire mechanism upon the housing 14 of the change speed gear set. A well known commercial form of gear set has upon its rear face a demountable plate 15 surrounding the power output shaft 16 and normally arranged to support the universal joint. The present disclosure contemplates the removal of the original plate and the substitution of a plate 15, as shown in these drawings, from which arms 160 project rearwardly in parallel relation to provide a guideway for a horizontally slidable carriage comprising the members 18 at each side of the device.

Each member 18 is made up of two sleeves 19 and 20 which are formed unitarily and are adapted to provide for the relative movement of the bearing elements, hereinafter to be described, in two planes at right angles. The sleeves 19 are guided to reciprocate upon rods 160 while sleeves 20 guide and support for reciprocative movement the vertical bars 21 which carry the housings 22 and 23 for shafts 24 and 25 respectively.

Shafts 24 and 25 comprise merely short lengths of shafting each of which is provided with a bearing within its respective housing element 22 or 23, from which the shafts respectively project at each end. The forward end of each shaft carries a coupling sleeve 30 which is squared so that each sleeve is adapted for operative engagement with the power delivering shaft 16 of the gear set. The opposite end of each shaft carries a well known form of universal joint represented at 31 which is preferably so designed that it also performs the function of an axially adjustable coupling, the splined ends 32 and 33 of one of the two drive shafts 13 and 12 being receivable therein. It will be obvious, therefore, that each one of the short shaft sections 24 and 25 is flexibly and extensibly connected to a particular drive shaft and each is potentially adapted for direct connection with the power output of the gear set.

For operating the mechanism to accomplish the selective coupling of either drive shaft to the engine 15, I provide two levers 35 and 36, the former controlling vertical movement and the latter horizontal movement of the take off mechanism. An arm 37 depends centrally from plate 15. Arm 37 carries integrally a bushing at 38 within which a sleeve 39 is oscillatable. Lever 36 is connected directly with the sleeve and so likewise is arm 45. Links 40 pivotally connect lever 36 and arm 45 with the bearing members 18 which comprise the horizontally movable carriage, thereby insuring simultaneous movement of such members without binding.

Figure 2:
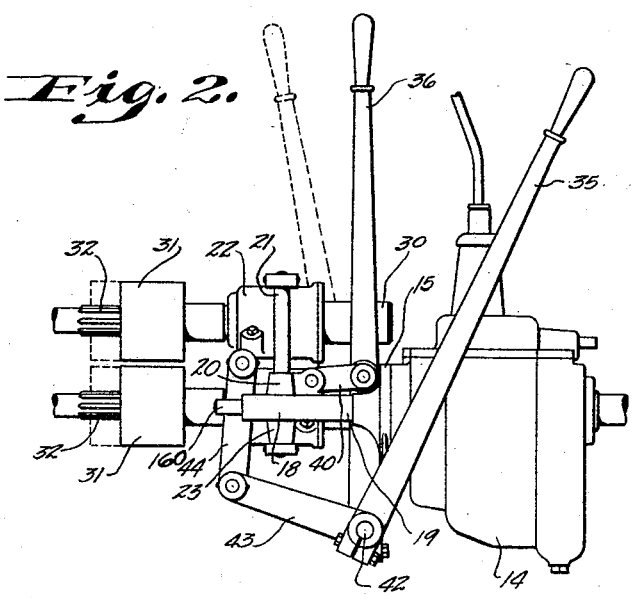
Figure 2 is an enlarged detail in side elevation of the power take off mechanism per se.
Figure 3:
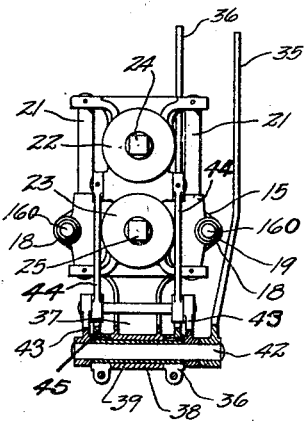
Figure 3 is a rear elevation thereof.
Figure 4:
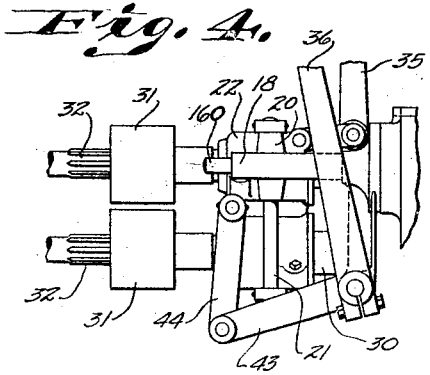
Figure 4 is a side elevation of the mechanism from a viewpoint similar to that of Figure 2 illustrating the adjustment necessary to effect connection of the alternative shaft to the source of power at the rear of the change speed gearing.
Figure 5:
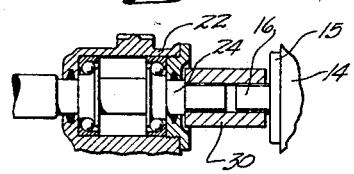
Figure 5 is a detail in axial section of the form of coupling used.

The oscillation of lever 36 between its full line and dotted line position, as shown in Figure 2, will move the carriage, the housings 22 and 23, the shaft sections 24 and 25, the universal joints 31, and the couplings 30 in a substantially horizontal plane, the whole mechanism being supported for this movement on the rods 160. The splined ends 32 and 33 permit this movement while maintaining operative driving connection between the universal joints and the drive shafts. It is possible, therefore, by such movement to disengage either of the couplings 30 from the driven shaft of the gear set 14 or to engage with such driven shaft either coupling which is in registry therewith.

Within sleeve 39 is a rock shaft 42 having arms 43 pivotally connected by links 44 with the pair of shaft bearing housings 22 and 23, at the end of shaft 42. Lever 35 is connected so that the oscillation of such lever will oscillate the rock shaft and arms 43 for the vertical adjustment of the bearings housings 22 and 23, shafts 24 and 25, universal joints 31, the forward ends of drive shafts 13 and 12, and the couplings 30. The sliding movement of bars 21 through bearing sleeves 20 guides the above named parts for such vertical movement in a plane determined by the position of lever 36. The vertical movement may be termed registering movement for the purpose of bringing one or the other coupling 30 into line with shaft 16, as distinguished from the coupling movement controlled by lever 36, whereby shafts are coupled or disengaged when aligned.

It will be obvious that by means of this invention it is possible to achieve a direct drive from the engine to extraneous mechanism such as pump 10 without the use of any intervening gearing whatsoever or, if speed reduction be desired, to bring into use the change gears in the gear set 14. If there is a direct drive through the change gear set there will be no gearing whatever interposed between the engine and the pump, and the pump will operate in the speed of the engine without the noise incident to the use of chains or gears and with much less difficulty in the way of lubrication than would be encountered if the use of chains or gears were necessary. It will be noted that the casings 22 and 23 are adapted to store lubricant whereby each may be operated over long periods of time without attention. The use of the universal joints to serve not only the function of an ordinary flexible coupling but also that of a slip joint to accommodate the movement required for coupling and uncoupling the respective shafts results in eliminating parts which might be used in some embodiments of this invention but which are unnecessary in the construction illustrated.

I claim:

1. In a motor vehicle, the combination with a power delivering shaft, a vehicle driving transmission shaft, and a supplemental transmission shaft, of a power take off mechanism to which both of said transmission shafts are connected, a relatively fixed guide for the aligning movement of said mechanism, means for adjusting said mechanism upon said guide to align said shafts alternatively with said power delivering shaft, and separate means for adjusting said mechanism for coupling and uncoupling with said power delivering shaft the transmission shaft aligned therewith.

2. In a motor vehicle, the combination with an engine, a transmission gear set, and a vehicle driving transmission shaft, of a supplement transmission shaft, and means for selectively coupling said transmission shafts directly to the output of said transmission gear set, said means comprising relatively extensible shaft sections connected to the respective transmission shafts, the bearing support for the respective shaft sections, a relatively fixed guide for said support in its movement in a direction to register one or the other of said shaft sections with the gear set output, means for selectively adjusting said shaft sections upon said guide alternatively into alignment with the output of said gear set, and extending with respect to said support form means for coupling to said output the shaft section aligned therewith.

3. In a motor vehicle, the combination with the engine and transmission gear set thereof, of a plurality of transmission shafts, and means supported from said gear set for selectively coupling said shafts thereto, said means comprising a guide mounted on said gear set, a carriage movable in one direction upon said guide, a bearing housing supported for movement in another direction upon said carriage, and shaft sections mounted in said bearing housing and connected with said transmission shafts, said shaft sections being provided with coupling elements adapted in one of said directions to be alternatively aligned with the output of said gear set and adapted in the other of said directions to be coupled therewith and uncoupled therefrom.

4. The combination with a gear set having an output shaft, of a mounting plate secured to said gear set, a bearing housing supported from said plate for movement in an aligning direction, and a coupling direction, and a pair of shafts carried by said housing and adapted alternatively for registry with the shaft of said gear set by the aligning movement of said housing and for coupling and uncoupling with said gear set shaft during the coupling movement of the housing.

5. In a device of the character described, the combination with a mounting plate provided with guide rods, of a carriage reciprocable within said rods, a housing reciprocable in a different direction with reference to said carriage, shaft sections carried by said housing and adapted therewith to partake both of the independent movement of said housing and the movement of said housing and said carriage, and means carried by said mounting plate for controlling both of said movements of said shaft sections.

6. The combination with a mounting plate provided with rearwardly projecting guides, of bearing members slidable upon said guides, a housing guided from said bearing members for movement transversely of the path of movement thereof, a pair of shaft sections carried by said housing and provided with clutch couplings at corresponding ends, a pair of levers pivotally supported from said plate, and links connecting said levers operatively with said housing whereby each of said levers independently controls said housing in one of its directions of movement.

7. In a device of the character described, the combination with a mounting plate adapted to be connected with a gear set about the power delivering shaft thereof, of a pair of rearwardly projecting guides, a carriage reciprocable upon said guides for coupling movement, a housing guided for vertical reciprocation with reference to said carriage for aligning movement, shaft sections provided with bearings in said housing and adapted in such aligning movement to be registered with the power delivering shaft from said gear set, couplings carried by said shaft sections and adapted in said coupling movement to engage said power delivering shaft when aligned therewith, a pair of levers concentrically pivotally supported from said plate, a link connecting one of said levers with said carriage, and a link connecting the other of said levers operatively with said housing whereby said levers are adapted independently to control said aligning and coupling movement.

8. The combination with a drive shaft and a plurality of driven shafts, of couplings respectively connected with the driven shafts and adapted alternatively for engagement with the drive shaft, a support provided with bearings for said couplings, and guide means mounting said support for rectilinear movements in a coupling direction and a shifting direction.

9. The combination with a drive shaft and a plurality of driven shafts, of couplings respectively connected with the driven shafts and adapted alternatively for engagement with the drive shaft, a support provided with bearings for said couplings, and guide means mounting said support for rectilinear movement in a coupling direction and a shifting direction, together with control means operatively connected with said support for the manipulation thereof.

10. The combination with a drive shaft and a plurality of driven shafts, of couplings respectively connected with the driven shafts and adapted alternatively for engagement with the drive shaft, a support provided with bearings for said couplings, and guide means mounting said support for rectilinear movements in a coupling direction and a shifting direction, together with control means operatively connected with said support for the manipulation thereof, said means comprising separate levers for the coupling and shifting movements of said support.

HIRAM H. HAIGHT.